United States Patent [19]

Gaspardo

[11] Patent Number: 4,567,864

[45] Date of Patent: Feb. 4, 1986

[54] CONNECTING-ROD SYSTEM PARTICULARLY FOR CUTTING ELEMENTS OF MOWERS

[76] Inventor: Luigi Gaspardo, Via Mussons 7, Morsano Al Tagliamento (Pordenone), Italy

[21] Appl. No.: 462,007

[22] Filed: Jan. 28, 1983

[30] Foreign Application Priority Data

Mar. 16, 1982 [IT] Italy ............................. 21151/82[U]

[51] Int. Cl.⁴ ............................. F02F 7/00; F16C 3/12
[52] U.S. Cl. ........................ 123/195 A; 123/DIG. 8; 56/17.5; 74/598; 74/379 R; 74/579 E
[58] Field of Search ............ 74/595, 596, 597, 579 R, 74/579 E, 598; 123/195 R, 195 A, DIG. 8; 56/17.5; 241/193, 194

[56] References Cited

U.S. PATENT DOCUMENTS

| | | | |
|---|---|---|---|
| 314,789 | 3/1885 | Bole | 74/595 |
| 1,363,466 | 12/1920 | Glor | 74/597 |
| 2,068,750 | 1/1937 | Lee | 74/595 |
| 2,190,411 | 2/1940 | Mattison | 74/597 |
| 2,755,093 | 7/1956 | Peter et al. | 74/597 |

FOREIGN PATENT DOCUMENTS

549108 11/1942 United Kingdom ............... 74/595

*Primary Examiner*—Kenneth J. Dorner
*Assistant Examiner*—Michael F. Trettel
*Attorney, Agent, or Firm*—Ladas & Parry

[57] ABSTRACT

A connecting-rod system particularly for mowers, wherein a crank, supporting a couple of rods, is linked to the driving shaft by means of a clamp fastened to said shaft by means of a threaded ring, and wherein the mutual positioning of crank and clamp is achieved by means of a key.

4 Claims, 2 Drawing Figures

CONNECTING-ROD SYSTEM PARTICULARLY FOR CUTTING ELEMENTS OF MOWERS

The present invention provides for a connecting-rod system particularly intended for operating the mower blades.

As it is known, mowers are generally provided with a couple of toothed blades which are run quickly and alternatively with respect to each other to effect mowing.

Such alternate motion is imparted by means of a couple of rotating heads set in correspondence of one end of the blades and driven by the tractor by means of a transmission-shaft. Due to the high speed of the motion that is imparted to them, said rotating heads are subject to considerable wear, increased by the great amount of powder and abrasive substances which help worsening the working conditions.

It often happens, therefore, that it is necessary to take these devices to pieces, in case of breakdown, in order to repair them. If these operations, included the subsequent re-assembling, are not particularly difficult when effected in an equipped workshop, problems arise when repairs and/or replacements must be effected in the open or in poorly equipped places.

The main difficulty which presents itself lies in the exact timing of the various parts, operation that requires utmost care if a perfect functioning of the machine, besides its duration, is sought.

As the devices presently used, because of their own structure, make it difficult to properly position, reciprocally, the different parts, the need makes itself felt for transmissions allowing an easy and precise assembling of the components even without the need for resorting to special equipments.

To this end, the present invention provides for a rod-connecting system particularly fit for being applied to mowers, consisting of few pieces, provided with devices allowing a safe and easy mounting as well as a proper positioning of all the components.

The present invention will be now described in detail with special reference to the accompanying drawings wherein.

Figure 1:
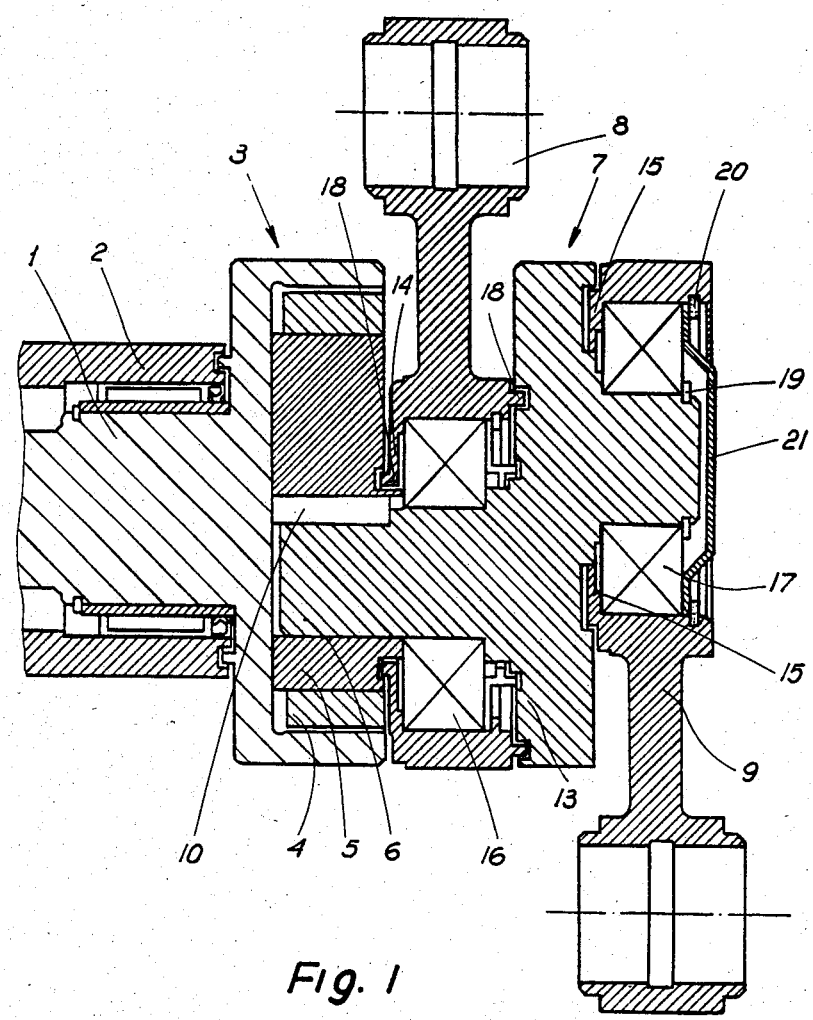
FIG. 1 is a section of a rod-connecting system according to the invention.
Figure 2:
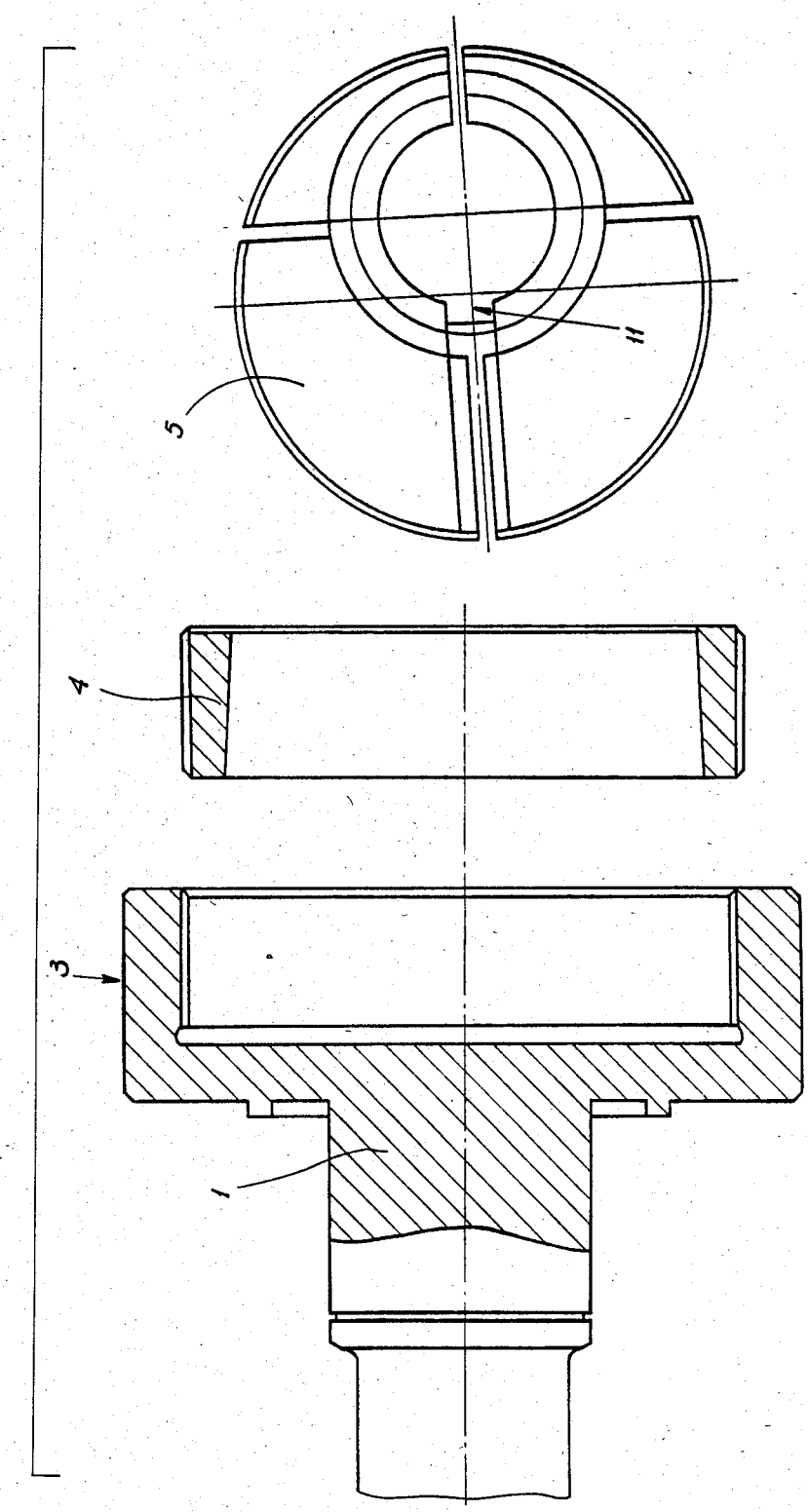
FIG. 2 shows some components of the system according to the invention; the two on the left are represented in section, and the third is represented by a front view.

With reference to FIG. 1, a driving shaft 1, mounted inside a fixed sleeve 2, has at one extremity a hollow head 3, internally threaded. A ring 4, externally threaded and having an inner conical part, screws into head 3 tightening a clamp 5 or the like.

In clamp 5 there is locked a crank pin 6 which is part of a crank indicated in its whole by 7, on which there are mounted a couple of rods 8 and 9.

The proper positioning of crank pin 6 is achieved by means of a key 10 or the like fitting a groove 11 in clamp 5 and crank pin 6.

Crank 7 comprises two crank pins 6 and 12, linked by the crank arm 13. The section of the heads of rods 8 and 9 is such as to define as many annular walls 14 and 15 serving for properly positioning bearings 16 and 17 respectively, through which bearings rods are mounted on the respective crank pins.

Furthermore, said rod heads have a series of annular projections, each indicated by No. 18, which fit into as many receiving seats made in the crank arm or in clamp 5, acting thus as barriers against powder. Once rod 8 is mounted, it is placed between clamp 5 and crank arm 6 and held therebetween.

Rod 9 and the relevant supporting bearing, on the contrary, are kept in place by an elastic ring 19 or the like, while an analogous ring 20 keeps a closure element 21 in place.

The assembling is made as follows:

First bearing 16 is inserted in the head of rod 8, a proper positioning being assured by wall 14. Then the bearing and rod are inserted on the crank pin 6, which is in its turn inserted in clamp 5, around which ring 4 has been previously set.

Key 10 provides the proper reciprocal positioning of crank 7 and clamp 5, after which ring 4 can be screwed into head 3 in order to keep the whole assembly firmly in place.

The mounting of rod 9, which is held by the elastic ring 19, can either follow or preceed the mounting of rod 8.

It can be seen, therefore, that thanks to the special shape of the components of the rod-connecting system according to the invention, they can be easily and quickly mounted with the aid of the few tools commonly used.

The mutual exact positioning, if necessary, of the different components is also assured by the special shape of the same. Obviously the sizes and the used materials can vary in accordance with the different requirements of use.

I claim:

1. A connecting rod system particularly for mowers, comprising in combination,
    a crank,
    a plurality of rods mounted on said crank and being supported therewith,
    a driving shaft linked to said crank by means of a clamp fastened to said shaft, said clamp having a groove and being fastened to said shaft by means of a threaded ring, said crank and said clamp being mutually positioned by means of a key fitted into said groove.

2. A connecting-rod for mowers according to claim 1 wherein said rods include rod heads and further including bearings which support said rod heads and wherein said crank includes a crank arm which serves for properly positioning the bearings supporting the rod heads.

3. A connecting-rod system for mowers according to claim 2, wherein said rod heads each define an annular wall for the exact positioning of each of said bearings.

4. A connecting-rod system according to claim 2, further including in correspondence with the rod heads, annular projections fitting into complementary seats made in the crank that act as anti-powder barriers.

* * * * *